United States Patent [19]

Albert

[11] Patent Number: 4,486,675
[45] Date of Patent: Dec. 4, 1984

[54] DIRECT CURRENT MAGNETIC MOTOR

[75] Inventor: Kenneth J. Albert, Canyon Country, Calif.

[73] Assignee: Walter C. Bagnell, Los Angeles, Calif.

[21] Appl. No.: 348,755

[22] Filed: Feb. 16, 1982

[51] Int. Cl.³ ............................................. H02K 37/00
[52] U.S. Cl. ...................................... 310/46; 310/112
[58] Field of Search ................................. 310/46, 112

[56] References Cited

U.S. PATENT DOCUMENTS

| | | | |
|---|---|---|---|
| 1,863,294 | 6/1932 | Bogia | 310/46 |
| 2,066,343 | 1/1937 | Gillen | 310/46 |
| 2,164,250 | 6/1939 | Lindell | 310/46 |
| 2,812,454 | 11/1957 | Buck | 310/231 X |
| 3,331,973 | 7/1967 | McClure | 310/268 X |
| 3,665,227 | 5/1972 | Busch | 310/46 |
| 3,751,698 | 8/1973 | Walker | 310/231 X |
| 3,832,581 | 8/1974 | Hoffman et al. | 310/268 X |

Primary Examiner—Donovan F. Duggan
Attorney, Agent, or Firm—Don J. Flickinger

[57] ABSTRACT

A DC magnetic motor includes first and second stator plates each equipped with first and second commutating rings and four ferromagnetic bodies (e.g. steel) or permanent magnets positioned in quadrature with angularly adjacent permanent magnets having opposite polarities. A pair of rotor plates are fixedly coupled to a central shaft which is mounted for rotation in the stator plates. The rotor plates house a plurality of electromagnets which are energized by a plurality of pairs of brushes which are coupled to the rotor plates and slide along the commutating rings. The segments of the commutating rings are energized and organized such that each electromagnet will be attracted to the next ferromagnetic body. The magnetic field in the electromagnets is collapsed by gaps between segments of the rings during the time in which each electromagnet is rotating by the ferromagnetic body to which it was attracted after which the magnetic field in the electromagnet is reversed.

7 Claims, 9 Drawing Figures

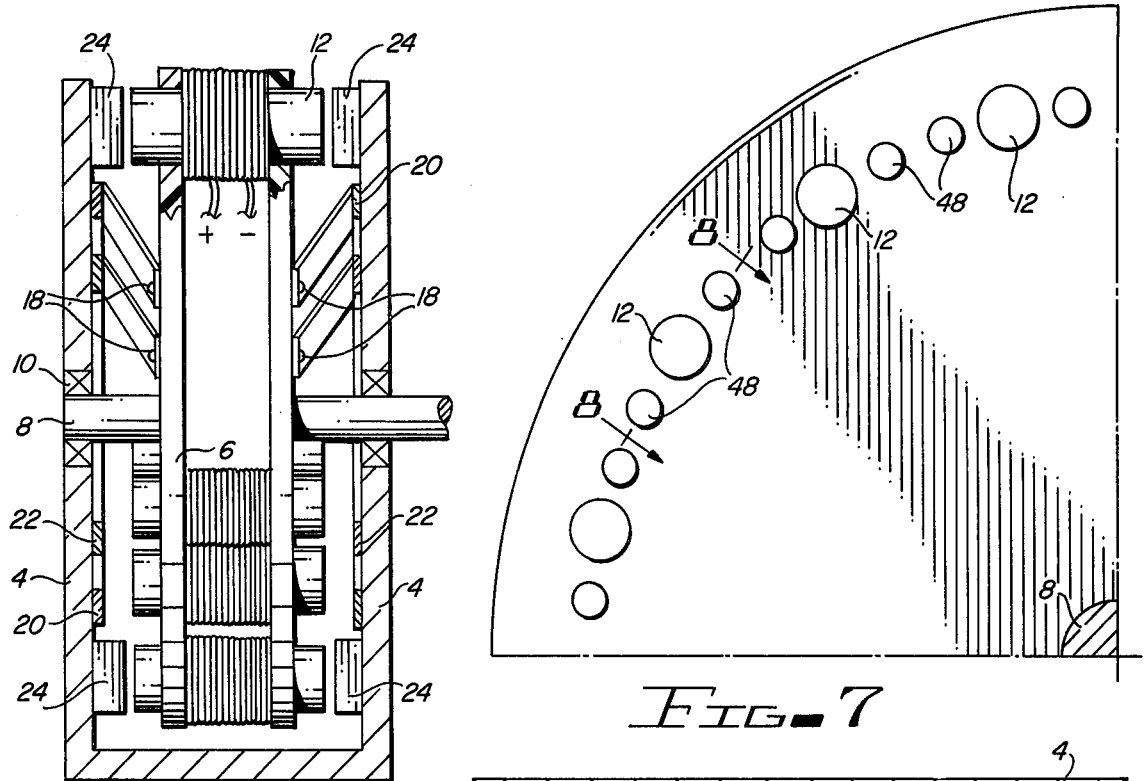
FIG-6
FIG-7
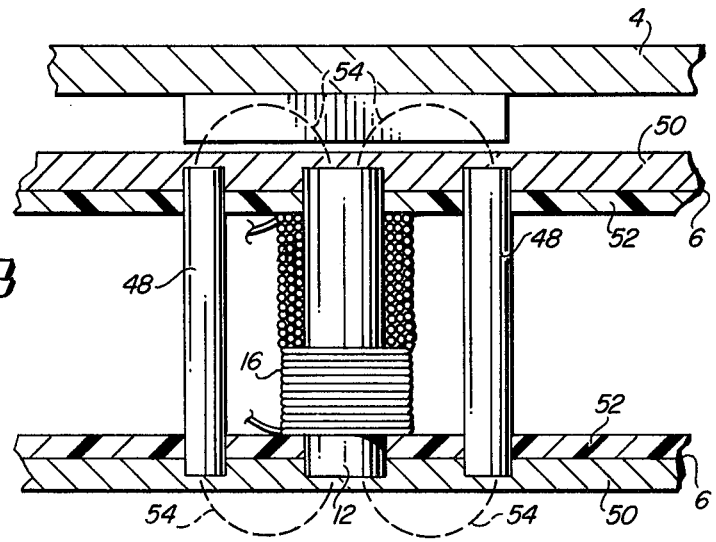
FIG-8
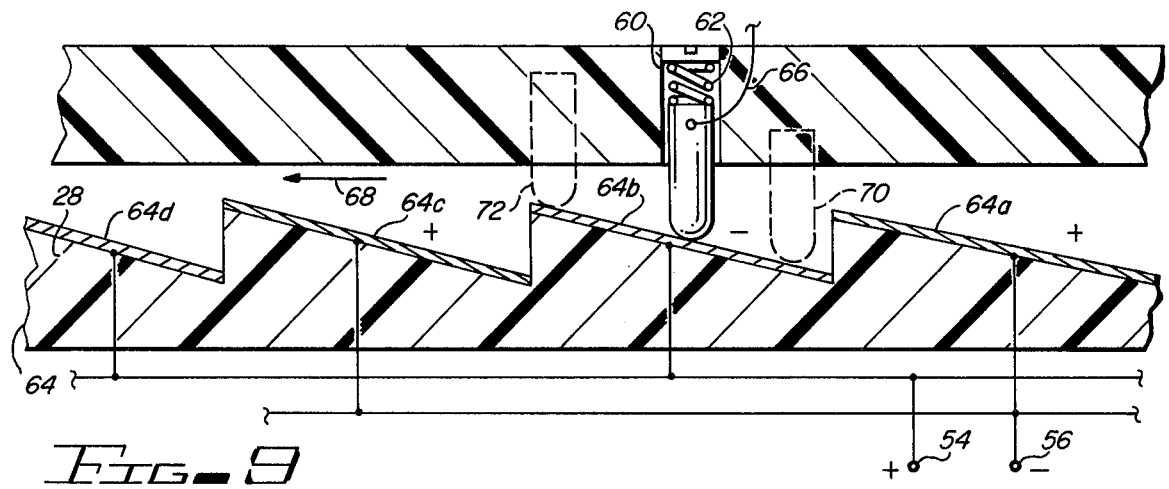
FIG-9

DIRECT CURRENT MAGNETIC MOTOR

BACKGROUND OF THE INVENTION

1. Field of the Invention

This invention relates generally to direct current (DC) magnet motors and, more particularly, to a magnetic motor system utilizing a plurality of ferromagnetic bodies (e.g. steel) on a stator which magnetically interact with a larger plurality of electromagnets on a rotor to turn a shaft, the electromagnets being energized in a predetermined sequence by commutator means on the stator.

2. Description of the Prior Art

It is well known that two magnetic poles of opposite polarity will attract each other. Furthermore, subject to certain restrictions, two magnetic poles of similar polarity will repel each other with a force which is directly proportional to the product of the individual pole strengths, and inversely proportional to the square of the distance separating them. The force is affected by the permeability of the medium through which the force acts which, for ordinary air, is nearly unity.

It is also well known that if any electric current is passed through a coil which is wrapped around a ferromagnetic core, the core will exhibit magnet properties in accordance with the direction of current flow. That is, the magnetic poles of the core may be reversed by reversing the direction of current flow in the coil Permanent magnets and electromagnets are employed in motors and their forces of attraction and repulsion utilized to impose a force upon the motor's armature to cause rotation or to cause the armature to be linearly displaced. In the case of a rotating armature, a problem must be overcome which may be simply described as follows. Assume that first and second bar magnets, each having a north pole and a south pole, are mounted for rotation adjacent each other. The bar magnets will align themselves parallel to each other due to the substantially equal forces of repulsion between like poles. If the force of repulsion between a first pair of like poles were converted to a force of attraction, as by insertion of a ferromagnetic material therebetween, the first pair of poles would rotate towards each other while the remaining pair of like poles would rotate away from each other. Thus, the forces of attraction and repulsion have been utilized to create rotation. Unfortunately, when the first pair of poles (which now may be considered opposite poles since they are attracted to each other) arrive at a position most proximate each other, the system will lock up and, unless additional steps are taken, further rotation is impossible.

The same problem exists in the case of an electromagnet rotating past a ferromagnetic body (such as steel) or a permanent magnet of a polarity which attracts the electromagnet. When the electromagnet reaches a position most proximate the ferromagnetic body or the permanent magnet, the forces of attraction will be the strongest and will resist further rotation.

Referring again to motors employing permanent magnets and electromagnets, it has been necessary to provide additional magnetic interaction at the lock-up points to achieve continuous and uninterrupted rotation. In some cases, this is accomplished using elaborate and complex switching means to control the energization of the electromagnets and the orientation of the magnetic fields to produce the continuous motive power.

SUMMARY OF THE INVENTION

It is an object of the present invention to provide an improved DC magnetic motor.

It is a further object of the present invention to provide a DC magnet motor which includes commutator means on a stator plate for alternating the magnetic fields of electromagnets housed proximate the periphery of a pair of rotor plates.

It is a still further object of the present invention to provide an apparatus for applying DC potentials of alternating polarity to the coil terminals of an electromagnet.

According to a broad aspect of the invention, there is provided a direct current magnetic motor comprising at least one stator plate; at least one ferromagnetic body mounted on the stator plate; first and second commutating rings, each including a plurality of segments mounted on the stator plate; at least one rotor plate; a plurality of electromagnets mounted on the rotor plate; and means coupled to the electromagnets and to the rings for sequentially producing in the electromagnets a first magnetic field therein, collapsing the first magnetic field, and reversing the magnetic field.

According to a further aspect of the invention, there is provided a direct current magnetic motor comprising a pair of stator plates; a pair of rotor plates mounted for rotation; a plurality of ferromagnetic bodies mounted on each of the stator plates; a pair of commutating rings each including a plurality of segments mounted on each of the stator plates; a plurality of electromagnets mounted near the peripheral of the rotor plates; and means coupled to the rotor plates and engaging the commutating rings and coupled to the plurality of electromagnets for energizing each of the electromagnets to first be attracted to one of the ferromagnetic bodies for then collapsing the magnetic field in the electromagnet as it rotates by the permanent magnetic to which it was previously attracted, and for reversing the magnetic field of the electromagnet.

According to a still further aspect of the invention, there is provided an apparatus for applying different potentials to a utilization device comprising a segmented ring wherein each segment comprises an electrically conductive ramp portion and a non-conductive step portion; means coupled to each of the ramp portions for applying a DC potential thereto, the potentials applied to adjacent ramp portions being different; carrier means mounted over the ring; and an electrically conductive plunger resiliently mounted within the carrier and coupled to the utilization device, the plunger sequentially engaging each of the conductive ramp portions when there is relative movement between the ring and the carrier in a predetermined direction.

The above and other objects, features and advantages of the present invention will be apparent from the following detailed description taken in conjunction with the accompanying drawings, in which:

BRIEF DESCRIPTION OF THE DRAWINGS

FIG. 6 is a cross-sectional view of the DC magnetic motor shown in FIG. 1;

FIG. 7 is a cross-sectional view of a portion of a rotor plate within a DC magnetic motor in accordance with a second embodiment of the present invention;

FIG. 8 is a partial cross-sectional view of one of the electromagnets housed within the rotor plate of FIG. 7; and FIG. 9 is a cross-sectional view of an alternate stator commutator and rotor brush assembly.

DESCRIPTION OF THE PREFERRED EMBODIMENTS

Figure 1:
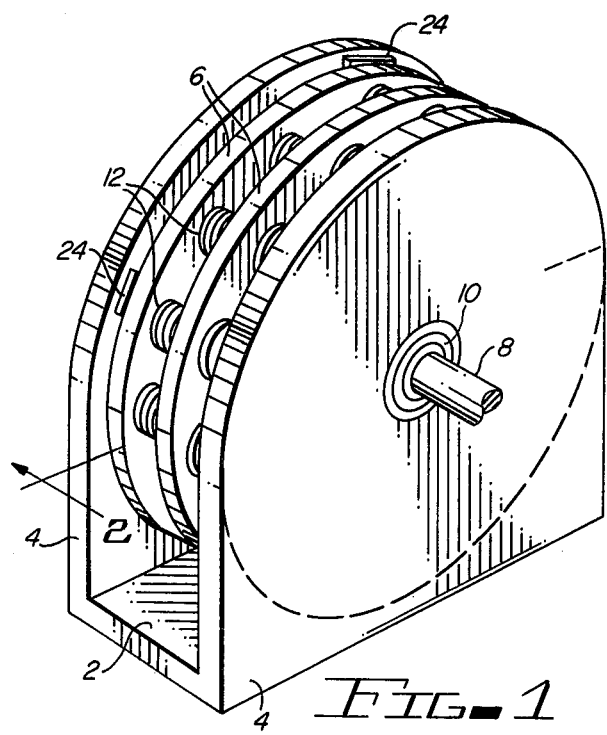
FIG. 1 is an isometric view of a DC magnetic motor in accordance with a first embodiment of the present invention.
Figure 3:
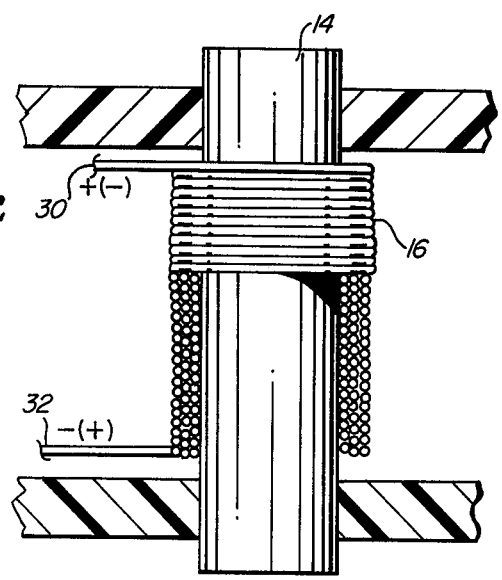
FIG. 3 is a partial cross-sectional view of one of the sixteen electromagnets positioned within the rotor plates of the motor shown in FIG. 1.

FIGS. 1 and 6 are isometric and cross-sectional views, respectively, of a DC magnetic motor embodying the teachings of the present invention. A stator comprises a base member 2 and first and second upwardly extending stator plates 4, each of which has an upward extending semicircular periphery. A pair of circular rotor plates 6 are fixedly coupled to a central shaft 8 which is in turn mounted for rotation within stator plates 4 by means of bearing assemblies 10. Rotor plates 6 have positioned therein a plurality (e.g. sixteen) of electromagnets 12, each of which comprise a ferromagnetic core 14 and a coil 16 wrapped around core 14 for carrying electric current as is more specifically shown in FIG. 3. Obviously, rotor plates 6 must be non-ferromagnetic so as not to short out the magnetic circuit. Also coupled to rotor plates 6 are a plurality of pairs of current conducting brushes 18 (typically four pairs) only two pairs of which are shown in FIG. 6. Each brush 18 is rigidly mounted to a rotor plate 6 and has a contact end which slides along one of two commutating rings 20 and 22 on the interior surface of the adjacent stator plate 4. Also coupled to the interior surface of each stator plate 4 are four bodies of ferromagnetic material (e.g. steel) or permanet magnets 24 positioned in quadrature; i.e., spaced 90° around each stator plate 4. If permanent magnets 24 are employed, the magnets are chosen such that diametrically opposed permanent magnets 24 on each stator plate 4 present similar pole face polarities to electromagnets 12 while angularly adjacent permanent magnets 24 on each stator plate 4 present opposite pole face polarities. Furthermore, permanent magnets 24 occupying corresponding positions in the first and second stator plates 4 must be of opposite polarities since they face opposite poles of the electromagnets 12.

Figure 4:
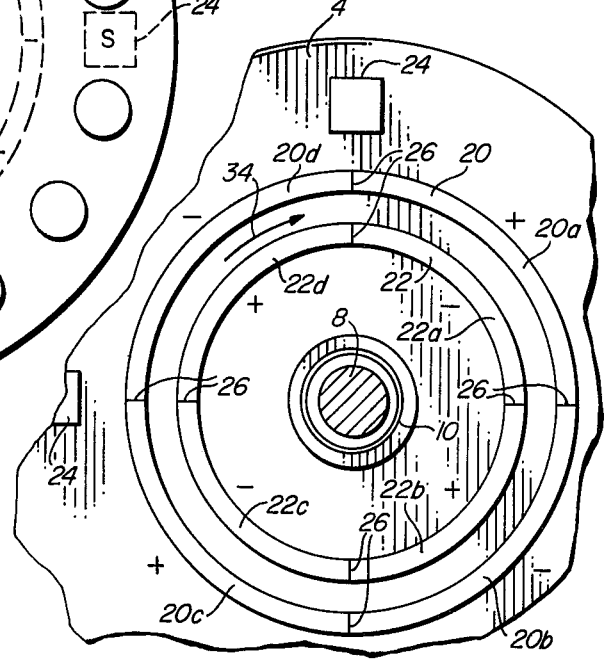
FIG. 4 is a cross-sectional view illustrating commutating rings and ferromagnetic bodies or permanent magnets fixed to the interior surface of a stator plate within the motor shown in FIG. 1.

FIG. 4 illustrates more clearly the interior surface of each stator plate 4. As can be seen, each of the rings 20 and 22 is divided into four quadrature segments (20a, 20b, 20c, 20d and 22a, 22b, 22c, 22d, respectively) with angularly adjacent segments in each ring coupled to electric potentials of opposite polarity. Furthermore, radially adjacent segments of commutating rings 20 and 22 are also coupled to potentials of opposite polarity. Thus, for example, segments 20a, 20c, 22b and 22d may be coupled to a positive potential while segments 20b, 20d, 22a and 22c may be coupled to a negative potential. The sources of opposite electric potentials may simply be DC batteries; however, a variety of circuit means would be obvious to the skilled practitioner for coupling potentials of the required polarity to the appropriate segments of the commutator rings 20 and 22.

Figure 5:
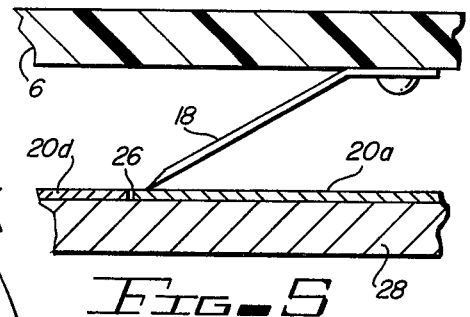
FIG. 5 is a cross-sectional view taken along line 5—5 of FIG. 2 illustrating one of the motor's brushes mounted on a rotor plate and sliding along a commutating . ring on a stator plate.

Between each angularly adjacent segment of rings 20 and 22 (for example, 20d and 20a) there is a gap 26 shown in more detail in FIG. 5. While each of the segments is made of an electrically conductive material, it should be clear that the material 28 beneath the rings and in contact therewith, must be a non-conducting material so as not to short the ring segments together. Thus, as brush 18 slides from segment 20d to segment 20a, there will be a reversal in potential of the brush 18, and just prior to the reversal (while the tip of brush 18 is over gap 26) there will be no potential applied to brush 18.

Referring again to FIG. 3, coil 16 wrapped around ferromagnetic core 14 has two ends 30 and 32 which are coupled to first and second brushes of a pair of brushes 18. If, for example, the first brush is contacting segment 22d of ring 22 and the second brush is contacting segment 20d of ring 20, then a positive potential will be applied to coil end 30 while a negative potential is applied to coil end 32. As a result, current will flow in coil 16 from terminal 30 to terminal 32 producing a magnet field in core 14 of a first polarity. When the first and second brushes reach gap 26 as a result of traveling in the direction shown by arrow 34 in FIG. 4, no current will flow in coil 16 since the potential difference between coil ends 30 and 32 has been removed thus destroying the magnetic field. Finally, when the first and second brushes reach segments 22a and 20a, respectively, coil end 30 will be coupled to a negative potential while coil end 32 is coupled to a positive potential. As a result, current will again flow in coil 16 but this time from coil end 32 to coil end 30. Core 14 will again be magnetized but this time the polarity of the magnetic field will be reversed.

Figure 2:
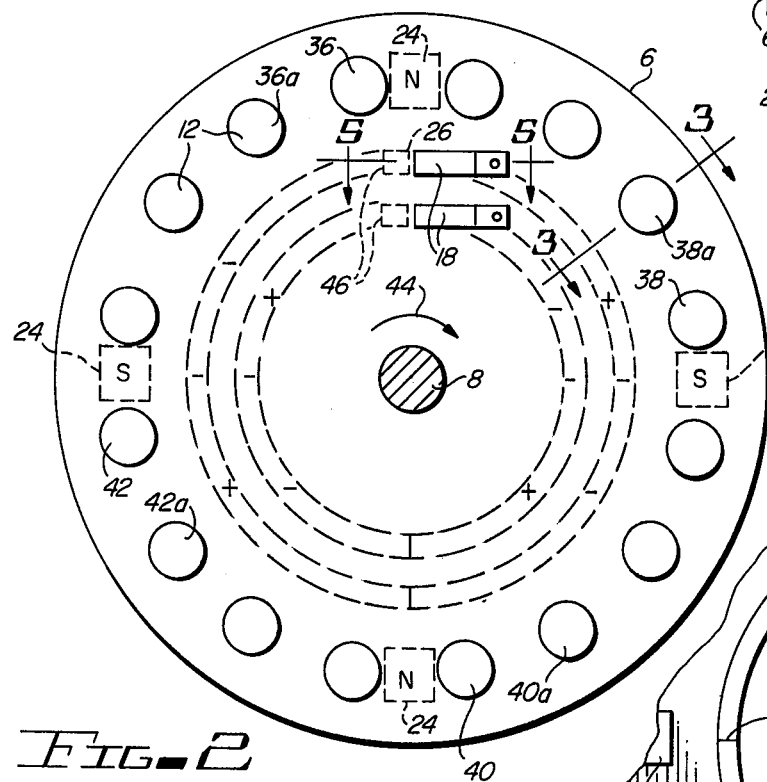
FIG. 2 is a cross-sectional view of the motor shown in FIG. 1 taken along line 2—2.

Having explained the individual principles upon which the present invention is based, the operation of the motor will now be discussed. FIG. 2 illustrates the relative positions of electromagnets 12, ferromagnetic bodies 24, commutator rings 20 and 22, gaps 26, and a single pair of brushes 18. If permanent magnets are employed, assume that the upper and lower permanent magnets exhibit a north polarity and that the left and right permanent magnets exhibit a south polarity. Further assume that the rotor plate 6 is turning in a clockwise direction as indicated by arrow 44. Dotted portions 46 of brushes 18 indicate the positions of the brushes 18 just prior to reaching gap 26. In this position, electromagnets 36 and 40 are energized by the potentials on rings 20 and 22 via brushes 18 to exhibit a south magnetic pole while electromagnets 38 and 42 are energized by the potentials on rings 20 and 22 via brushes 18 to exhibit a north magnetic pole. Electromagnets 36, 38, 40 and 42 are attracted towards ferromagnetic bodies 24 in a clockwise direction. When electromagnets 36, 38, 40 and 42 reach positions most adjacent permanent magnets 24, the contacts of brushes 18 will reach gap 26 destroying the magnetic fields in electromagnets 36, 38, 40 and 42. This permits electromagnets 36, 38, 40 and 42 to easily rotate past bodies 24 at which point the contacts of brushes 18 make contact with the next angularly adjacent segments of rings 20 and 22. This reverses the magnet fields in electromagnets 36, 38, 40 and 42; i.e., electromagnets 36 and 40 exhibit a north magnetic pole while electromagnets 38 and 42 exhibit a south magnetic pole. If bodies 24 are permanent magnets with the polarities described above, then electromagnets 36, 38, 40 and 42 will be repelled in a clockwise fashion. If bodies 24 are not permanent magnets and there is no repelling force, the flywheel action of the rotating stator is sufficient to overcome any tendency to lock up. Furthermore, electromagnets 36, 38, 40 and 42 have moved sufficiently past bodies 24 to render the forces of attraction between electromagnets 36a, 38a, 40a, and 42a controlling. This magnetic pole reversal procedure is repeated each time brushes 18 cross a gap 26; i.e., first the magnetic field is collapsed and then reproduced with opposite poles. Each of the remaining three sets of quadrature electromagnets undergo a similar pole reversal process via a separate pair of brushes 18 each time the brushes reach a gap 26. The end result is efficient rotation of rotor plates 6 and therefore, shaft 8 to produce high torque motive power.

FIG. 7 and 8 illustrate an alternate rotor/electromagnet assembly suitable for use in the inventive DC magnetic motor. In order to increase magnetic flux density and therefore the forces of attraction and repulsion, each main electromagnetic core 12 has associated therewith two secondary cores 48. Furthermore, each rotor plate 6 now comprises a ferromagnetic layer 50 and a non-ferromagnetic layer 52. The flux path through core 12, layers 50, ferromagnetic body 24 and secondary cores 48 is illustrated by dotted lines 54. As a result of the increased magnetic forces which are due to the greater flux density, the torque of the motor is increased.

FIG. 9 illustrates an alternate commutator/brush assembly. Each brush consists of a conductive plunger 58 mounted within a chamber 60 in rotor plate 6 and coupled to appropriate electromagnets via wire 66. The plunger is biased by spring 62 into contact with the commutating segments of a ring 64. For the purposes of explanation, ring 64 is linearly represented although it should be clear that in practice it will be circular and that conductive segments 64a, 64b, 64c, and 64d are actually 90° circular segments. As was the case previously, material 28 is a non-conductive material, and each adjacent segment is coupled to sources of opposite potential, for example, at terminals 54 and 56. As shown, each segment includes a ramp portion and a step ortion. The step portions are positioned as were gaps 26 in FIGS. 2 and 4.

If it is assumed that rotor plate 6 is moving to the left as indicated by arrow 68 while slip ring 64 remains stationary, plunger 58 will contact each conductive segment, for example 64b, at a low point on the ramp as indicated by the dotted representation 70 of plunger 58. Plunger 58 will slide along the segment until it reaches the uppermost point indicated by dotted representation 72. All during this time, a negative potential has been applied to the electromagnet terminals coupled to plunger 58. As plunger continued its movement to the left, it will fall off segment 64b. After a brief period of time during which plunger 58 is falling, it will contact segment 64c. During the time in which plunger 58 is falling, no current flows in its associated electromagnet coils and the magnetic fields therein collapse. When plunger 58 contacts segment 64c, magnetic fields of opposite polarity will be produced in the plunger's associated electromagnets. The fall time of the plunger corresponds to that time when its associated electromagnets are passing by the permanent magnets on the stator plates 4.

The above description of preferred embodiments is given by way of example only. Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the present invention in such clear and concise terms as to enable those skilled in the art to understand and practice the same, the invention claimed is:

1. A direct current magnetic motor comprising:
    (A) a pair of stator plates disposed parallel to and aligned with one another;
    (B) a plurality of permanent magnets mounted on inside faces of each of said stator plates such that diametrically opposed permanent magnets on each stator plate are of the same polarity, circumferentially adjacent permanent magnets on each stator plate are of opposite polarity, and facing magnets are of opposite polarity;
    (C) a rotor assembly including:
        1. a pair of rotor plates;
        2. a central shaft fixedly coupled to said pair of rotor plates and mounted for rotation in said pair of stator plates; and
        3. a plurality of electromagnets mounted proximate the periphery of said pair of rotor plates;
    (D) a concentric pair of segmented commutator rings mounted on each of said stator plates, each of said segments in each of said pair of commutator rings being separated from circumferentially adjacent segments by a non-conductive gap;
    (E) at least one pair of electrically conductive brush means carried by said rotor plates, each brush means of said pair slideably engaging one of said segmented commutator rings;
    (F) said brush means being coupled to said plurality of electromagnets for:
        1. first, energizing at least one of said plurality of electromagnets to be attracted to one facing pair of said plurality of permanent magnets;
        2. second, collapsing the magnetic field of said at least one of said plurality of electromagnets as it rotates by said one facing pair of magnets and as said brush means impinges non-conductive gaps in said commutator rings; and
        3. third, energizing said at least one of said plurality of electromagnets to be repulsed from said one facing pair of said plurality of permanent magnets.

2. The direct current motor of claim 1 in which said plurality of permanent magnets comprises four permanent magnets positioned in quadrature on each of said pair of stator plates.

3. The direct current motor of claim 1 in which said plurality of electromagnets comprises sixteen electromagnets mounted on said pair of rotor plates, said electromagnets being selectively coupled to four pairs of said brush means.

4. The direct current motor of claim 3 wherein each of said segments comprises a conductive ramp portion and a non-conductive step portion.

5. The direct current motor of claim 4 in which each of said electrically conductive brushes comprises a plunger which is resiliently mounted within one of said rotor plates.

6. The direct current motor of claim 1 in which each rotor plate is made of a non-ferromagnetic material.

7. The direct current motor of claim 1 in which each rotor plate comprises a first layer of ferromagnetic material and a second layer of non-ferromagnetic material.

* * * * *